(12) United States Patent
Rosenboom (10) Patent No.: US 7,726,749 B2
(45) Date of Patent: Jun. 1, 2010

(54) TRACK ASSEMBLY WITH BOGIE WHEEL STRUCTURE

(76) Inventor: Lyn Rosenboom, 841 E. 3000 N. Rd., Clifton, IL (US) 60927

(*) Notice: Subject to any disclaimer, the term of this patent is extended or adjusted under 35 U.S.C. 154(b) by 184 days.

(21) Appl. No.: 11/672,151

(22) Filed: Feb. 7, 2007

(65) Prior Publication Data

US 2007/0138866 A1 Jun. 21, 2007

Related U.S. Application Data (63) Continuation-in-part of application No. 10/776,086, filed on Feb. 10, 2004, now Pat. No. 7,380,892, which is a continuation-in-part of application No. 09/847,264, filed on May 2, 2001.

(60) Provisional application No. 60/776,746, filed on Feb. 23, 2006.

(51) Int. Cl.
*B62D 55/00* (2006.01)

(52) U.S. Cl. .................. 305/124; 305/155; 180/9.46; 280/124.111

(58) Field of Classification Search .................. 305/116, 305/124, 125, 135, 136, 143, 150, 155; 180/9.46; 280/124.11, 124.111
See application file for complete search history.

(56) References Cited

U.S. PATENT DOCUMENTS

| | | | |
|---|---|---|---|
| 1,356,038 A | 10/1920 | Carey | |
| 1,368,652 A | 2/1921 | Pennington et al. | |
| 1,451,627 A | 4/1923 | Munson | |
| 1,539,582 A | 5/1925 | Landry | |
| 1,990,900 A | 2/1935 | Glasier | |
| 2,052,068 A | 8/1936 | Ziegler | |
| 2,345,158 A | 3/1944 | Schroter et al. | |
| 2,467,947 A | 4/1949 | Skelton | |
| 2,753,190 A | 7/1956 | Hooven | |
| 3,170,532 A | 2/1965 | Boppart, Jr. | |
| 3,275,386 A * | 9/1966 | Bexten | 305/155 |
| 3,292,943 A | 12/1966 | Crockett | |
| 3,333,867 A | 8/1967 | Schultze | |
| 3,343,889 A * | 9/1967 | Bexten | 305/155 |
| 3,455,405 A * | 7/1969 | Parent | 180/9.46 |
| 3,506,079 A | 4/1970 | Madler et al. | |
| 3,556,455 A | 1/1971 | Storm et al. | |
| 3,565,198 A | 2/1971 | Ames | |
| 3,613,810 A | 10/1971 | Hetteen et al. | |
| 3,826,325 A | 7/1974 | Purcell et al | |
| 3,837,714 A | 9/1974 | Russ, Sr. | |

(Continued)

*Primary Examiner*—Russell D Stormer
(74) *Attorney, Agent, or Firm*—Dorsey & Whitney LLP; Jason M. Hunt; Brian J. Laurenzo (57) ABSTRACT

A tread assembly has front and rear main idler wheels supported by a frame. An assembly is provided to permit the front idler wheels to pivot laterally as the cart encounters uneven ground, in order to improve weight distribution across the tread and the idler wheels. The rear idler wheel also has an assembly to permit the rear idler wheel to pivot laterally. An alignment feature is incorporated into the front idler wheel assembly to permit adjustment of the alignment of the front idler wheel relative to the rear idler wheel. A tensioning mechanism is provided at the rear idler wheel to maintain the tread in tension. A bogie wheel structure is pivotally connected to the frame and positioned between the front and rear idler wheels.

5 Claims, 12 Drawing Sheets

U.S. PATENT DOCUMENTS

| | | | |
|---|---|---|---|
| 3,860,079 A | 1/1975 | Hoffman | |
| 3,951,483 A | 4/1976 | Nakamura | |
| 4,019,268 A | 4/1977 | Waterman | |
| 4,087,135 A * | 5/1978 | Unruh | 305/125 |
| 4,166,511 A * | 9/1979 | Stedman | 180/9.5 |
| 4,230,199 A | 10/1980 | Stedman | |
| 4,420,272 A | 12/1983 | Ingalls et al. | |
| 4,537,267 A * | 8/1985 | Satzler | 180/9.1 |
| RE32,442 E | 6/1987 | Satzler | |
| 4,681,177 A | 7/1987 | Zborowski | |
| 4,781,257 A * | 11/1988 | Gee et al. | 180/9.5 |
| 4,932,677 A | 6/1990 | Shustack | |
| 4,936,639 A | 6/1990 | Pohjola | |
| 4,940,002 A | 7/1990 | Bien | |
| 5,127,714 A | 7/1992 | Satzler | |
| 5,168,632 A | 12/1992 | Rimlinger, Jr. | |
| 5,286,044 A | 2/1994 | Satzler et al. | |
| 5,312,176 A * | 5/1994 | Crabb | 305/124 |
| 5,373,909 A | 12/1994 | Dow et al. | |
| 5,409,305 A | 4/1995 | Nagorcka | |
| 5,451,135 A | 9/1995 | Schempf et al. | |
| 5,452,949 A | 9/1995 | Kelderman | |
| 5,494,125 A | 2/1996 | Gustin et al. | |
| 5,531,282 A | 7/1996 | Jennen | |
| 5,639,148 A * | 6/1997 | Sheidler | 305/116 |
| 5,899,543 A * | 5/1999 | Lykken et al. | 305/131 |
| 5,927,412 A | 7/1999 | Crabb | |
| 5,988,775 A | 11/1999 | Nordberg | |
| 6,125,956 A | 10/2000 | Gignac | |
| 6,131,833 A | 10/2000 | Chapman | |
| 6,176,334 B1 | 1/2001 | Lorenzen | |
| 6,244,613 B1 | 6/2001 | Renger | |
| 6,249,994 B1 | 6/2001 | Oertley | |
| 6,267,459 B1 | 7/2001 | Becker et al. | |
| 6,273,530 B1 | 8/2001 | Johnson et al. | |
| 6,289,995 B1 | 9/2001 | Fuller | |
| 6,318,484 B2 | 11/2001 | Lykken | |
| 6,502,840 B1 | 1/2003 | Leyonhjelm et al. | |
| 6,604,796 B2 * | 8/2003 | Boyum | 305/145 |
| 6,640,915 B2 * | 11/2003 | Haringer | 180/9.26 |
| 6,641,235 B2 | 11/2003 | Boyum | |
| 6,959,936 B2 | 11/2005 | Anderson | |
| 7,380,892 B2 * | 6/2008 | Rosenboom | 305/124 |
| 2002/0101052 A1 | 8/2002 | Panizzolo | |

* cited by examiner

TRACK ASSEMBLY WITH BOGIE WHEEL STRUCTURE

CROSS REFERENCE TO RELATED APPLICATIONS

This application claims the benefit of related U.S. Provisional Application Ser. No. 60/776,746, filed on Feb. 23, 2006, the entire contents of which is hereby incorporated by reference. This application is also a continuation-in-part of U.S. patent application Ser. No. 10/776,086, filed Feb. 10, 2004, now U.S. Pat. No. 7,390,892 which is a continuation-in-part of U.S. patent application Ser. No. 09/847,264, filed May 2, 2001, the entire contents all of which are hereby incorporated by reference.

FIELD OF THE INVENTION

The present invention relates to idler wheel assemblies for use with continuous tracks, such as might be found on agricultural carts. More particularly the present invention relates to front and rear idler wheel assemblies that permit the front and rear idler wheels to pivot transversely to the direction of travel of the continuous track, in order to permit the bottom tread portion of the track to match the contours of uneven ground and encourage equal weight distribution on the idler wheels, to an idler wheel assembly that self adjusts the tension in the continuous track in response to increased loading, and to a bogie wheel structure that more equally distributes the weight of the cart.

BACKGROUND

Vehicles that utilize continuous tracks, rather than wheels are well known. These continuous tracks have several advantages over wheels. Most notably, they spread the weight of the vehicle across a greater surface area than would be practical with wheels. These tracks are provided on track assemblies that include front and rear idler wheels around which the continuous track is provided. The frame is provided with some means to hold the front and rear idler wheels, in order to place the track in tension. As the vehicle is moved along the ground, the track translates with respect to the frame, and front and rear idler wheels are rotated. Intermediate idler wheels may be used to provide additional support to the bottom span of the track, which contacts the ground. Typically, two such track assemblies are provided, laterally spaced apart, to support a cart or other vehicle.

As the cart moves across the ground, it commonly will encounter uneven areas. Typically the front and rear idler wheels are mounted to rotate in a fixed plane relative to the frame. Therefore, as the tread encounters irregularities, and especially irregularities across the width of the tread, a twisting force may result on the tread, which can result in uneven loading of the tread and the idler wheels. This problem has been partially solved by applicant's co-pending U.S. application Ser. No. 09/847,264 by making the intermediate idler wheels pivotal in both longitudinal and lateral directions. However, the weight distribution could be further improved if the front and rear idler wheels were also designed to pivot laterally as the tread encounters uneven ground.

One complicating factor with pivoting the front idler wheels involves the need to include an alignment feature that allows adjustment of the alignment of the front idler wheel relative to the rear idler wheel. In order to compensate for small variations in the treads and the frame, it is desirable to allow some adjustment of the plane in which the front idle wheel rotates relative to the frame in order to match the plane of the rear idler wheel in order to have them properly aligned during use. This means that a simple pivoting feature for the front idler wheel may not be sufficient in all cases.

Another difficulty associated with rigidly mounted front and rear idler wheels is that because they do not pivot to match the contours of the land, the loading of the components is uneven. Therefore, the components, such as the frame, hub must be made stronger than would be required if the loading was shared equally. Therefore, the uneven loading of the parts leads to over engineering and increased costs. For example the tensioning device that holds the track in tension needs to handle a larger load if the loading of the components is not evenly distributed. That means that a larger capacity hydraulic shock must be used, or if air shocks are used, they must be inflated to a greater pressure than desired.

In order to retain the track in place on the idler wheels it is necessary to keep the track in tension. As heavier loads are added, it is desirable to increase the tension in the track. This can be done manually to compensate for a heavy or light load as it is added. However, it would be desirable to have the tension self-adjust to some extent, and to adjust as the load applied to the frame changes during travel, as for example on encountering a bump.

Therefore, a need exists to overcome one of more of the above-identified disadvantages of the current designs.

SUMMARY

According to one embodiment of the invention a track assembly includes an elongated spindle tiltably connected to a frame to tilt from side to side. A first idler wheel is mounted on the spindle. A second idler wheel is operationally associated with the frame, and a continuous track is provided around the first and second idler wheels with a lower span between the first and second idler wheels forming a tread portion. The second idler wheel may also be mounted on a tiltable spindle. An alignment mechanism may be provided to selectively vary an alignment of the first idler wheel. The alignment mechanism can include an alignment bracket attached to the spindle at one end and an adjustment mechanism at the opposite end. The adjustment mechanism may be an eccentric bushing. A cart may be formed that includes two of the track assemblies According to another embodiment of the invention a track assembly includes a frame having a first end and a second end. A first idler wheel is operably associated with the frame at the first end of the frame. A link is pivotally connected to the rear of the frame for pivoting in a generally vertical plane around a pivot member. An imaginary dividing plane is defined by extending the pivot axis of the pivot member vertically. A second idler wheel is operably provided on the link. A tensioning device maintains the axis of the second idler wheel on the opposite side of the imaginary dividing plane from the first idler wheel. A continuous track is provided around the first and second idler wheels with a lower span between the first and second idler wheels forming a tread portion. The idler wheels may be mounted on tiltable spindles to permit the idler wheels to tilt with tread portion as the track assembly is moved across uneven ground. A mechanism may be provided for varying the alignment of the first idler wheel.

Yet another embodiment of the invention includes a bogie wheel structure pivotally connected to the frame and positioned between first and second idler wheels.

DETAILED DESCRIPTION

The features and other details of the invention will now be more particularly described and pointed out in the claims. It will be understood that the particular embodiments of the invention are shown by way of illustration and not as limitations of the invention. The principle features of this invention can be employed in various embodiments without departing from the scope of the invention.

Figure 1:
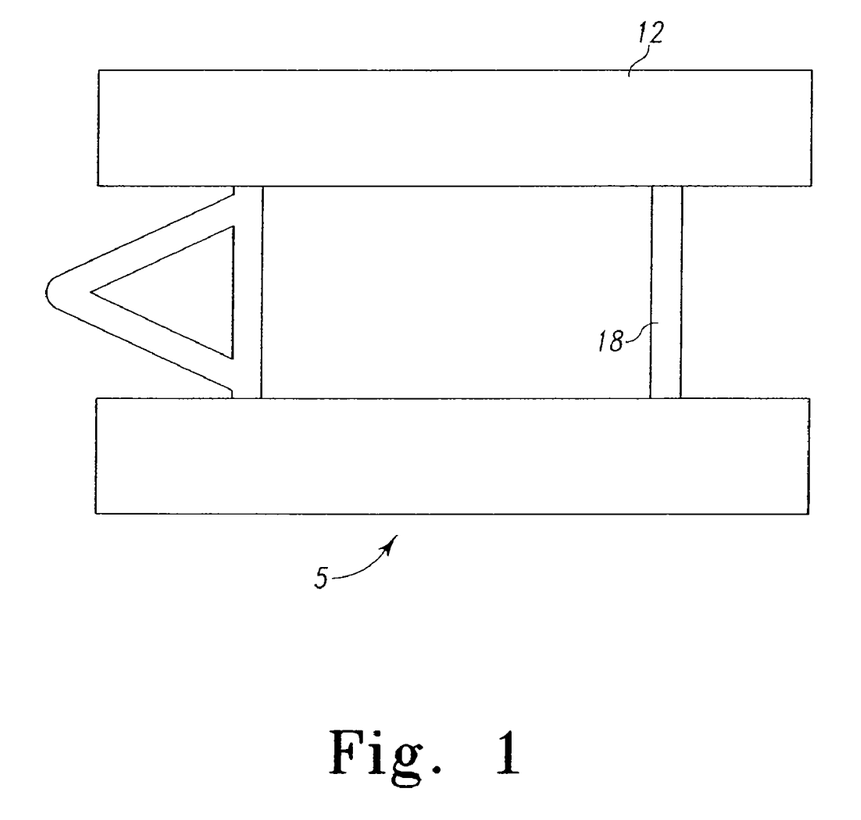
FIG. 1 is a top plan view of a cart incorporating two track assemblies according to the present invention.

FIG. 1 is a top plan view of a cart 5 that is provided with a pair of track assemblies 10 mounted on a frame 18. The inventive aspects of this disclosure relate to the track assemblies and the particular arrangement of the frame is not critical. The embodiments shown are intended to be pulled in a generally forward direction, but may also be pushed in reverse. It may also be possible to make the units self propelled by including a motor to drive the idler wheels.

Figure 2:
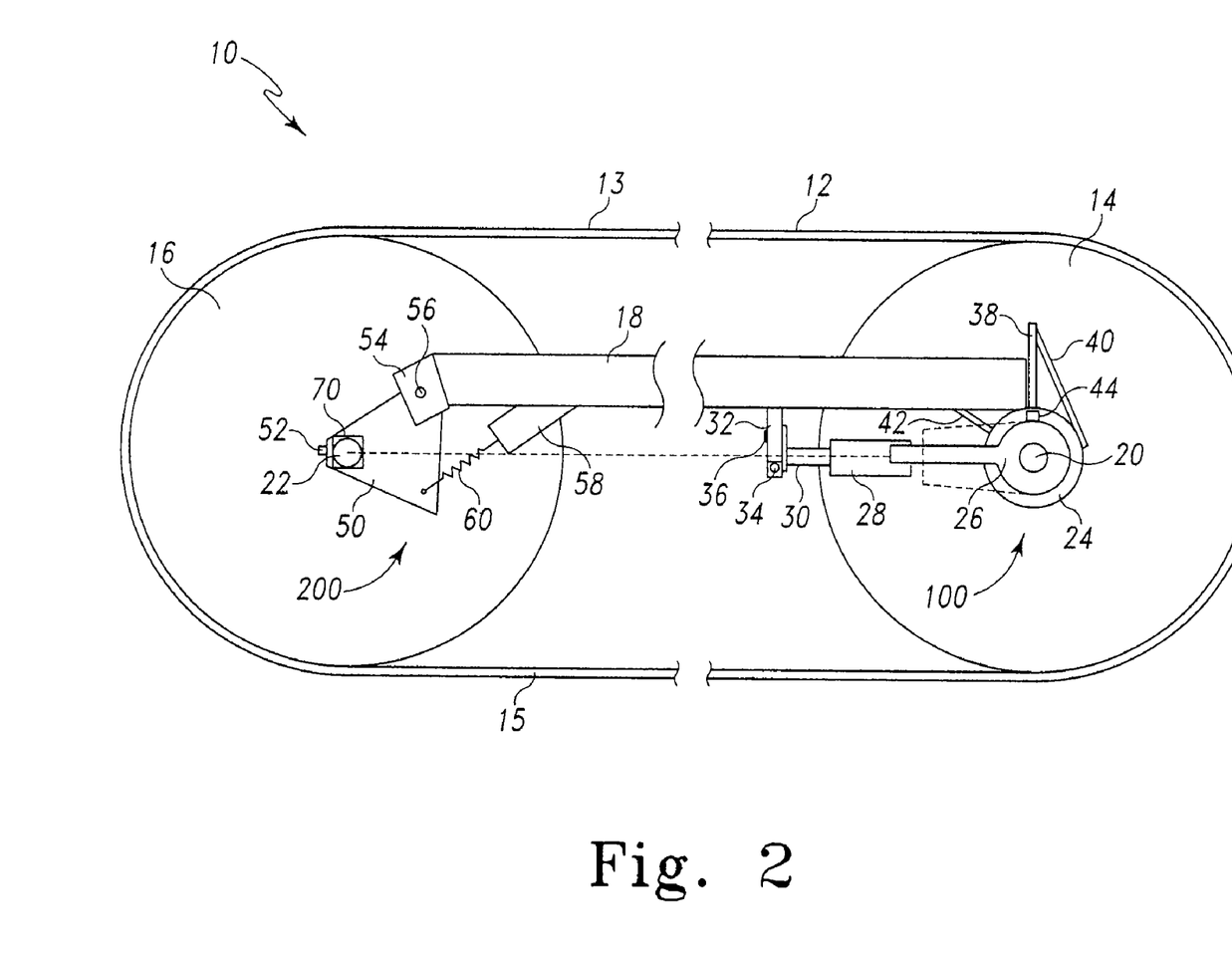
FIG. 2 is a side view of an embodiment of a tread assembly according to the present invention.

With reference to FIG. 2, a track assembly 10 is shown in a side elevation view. The track assembly 10 includes a frame 18, front idler wheel 14, and rear idler wheel 16. The front and rear idler wheels are mounted on front and rear spindles 20 & 22. A continuous track 12 is wrapped round the idler wheels 14 & 16 with a top span 13 and a bottom span 15 between the idler wheels 14 & 16. The bottom span 15, forms a tread which provides a contact surface for engaging the ground. Is should be understood that typically (though not required) there will be two side-by-side front idler wheels and two side-by-side rear idler wheels, and the spindles 20, 22 will be double ended to support a pair of idler wheels. Alternatively, in place of the double ended spindle, a pair of opposing axially-aligned spindles could be used. Only one front idler wheel 14 and rear idler wheel 16 is shown in FIG. 2, in order to expose the construction of the track assembly 10. The track may be provided with a ridge that rides between groove formed between each pair of idler wheels to help retain the track in place aligned with the idler wheels. The track assembly 10 may be incorporated into a cart for providing a tracked support for the cart. Typically, two such track assemblies 10 will be provided that are laterally spaced apart to support the cart.

With further reference to FIG. 2, a front idler wheel assembly 100 is provided at a forward end of the frame 18. The front idler wheel assembly 100 provides structure that allows the front idler wheel to pivot about a generally horizontal, longitudinal axis (roll axis) (not shown) so that as the tread 15 encounters irregularities, the front idler wheel 14 and track 12 can pivot to better match those contours. The front idler wheel assembly 100 also permits the angular alignment (yaw) of the front idler wheel 14 to be adjusted left or right (into or out of the page in FIG. 2) with respect to the frame 18, in order to be aligned properly with the rear idler wheel 16.

Figure 3:
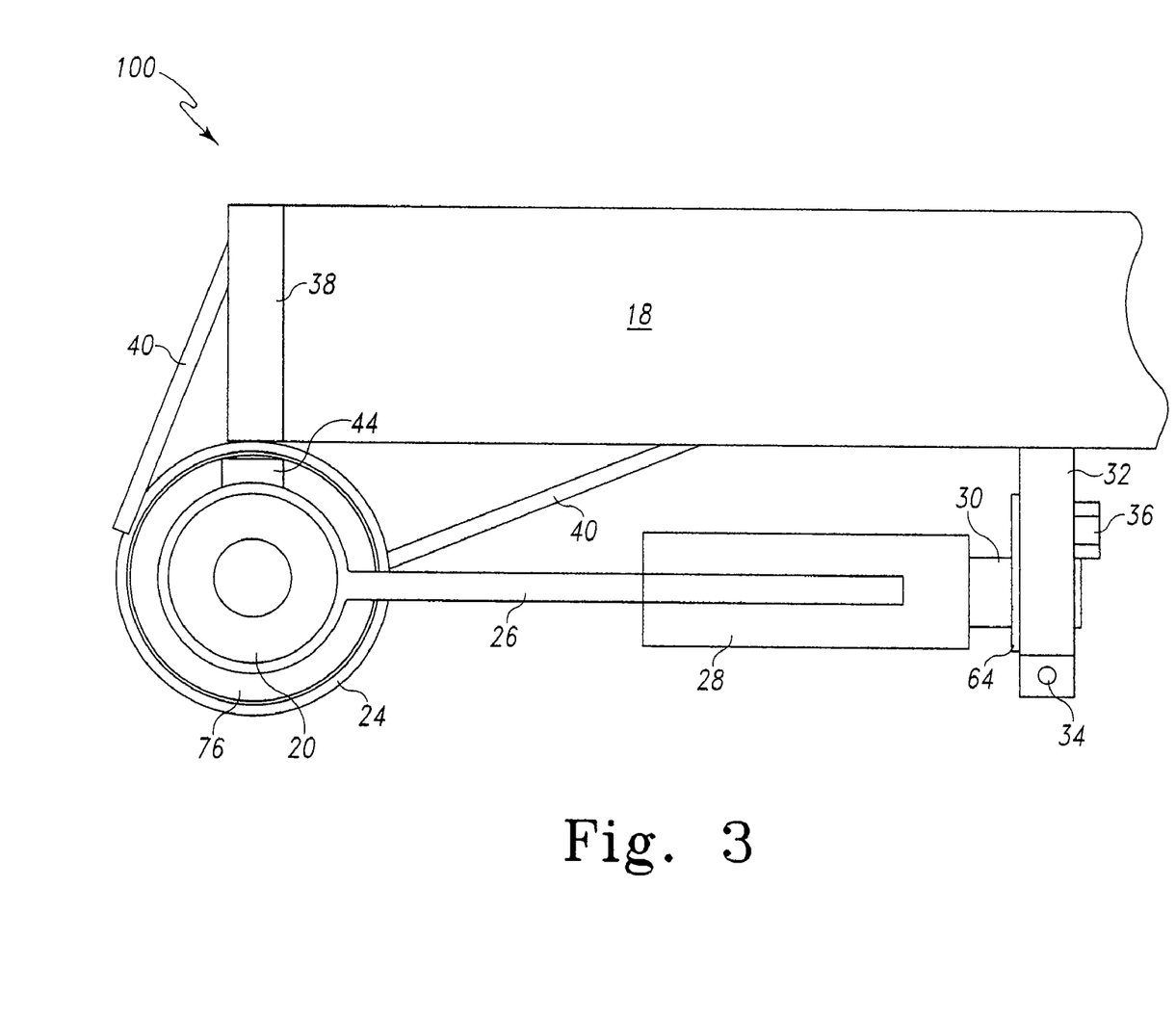
FIG. 3 is a partial side view of an embodiment of a front idler wheel assembly according to the present invention.
Figure 4:
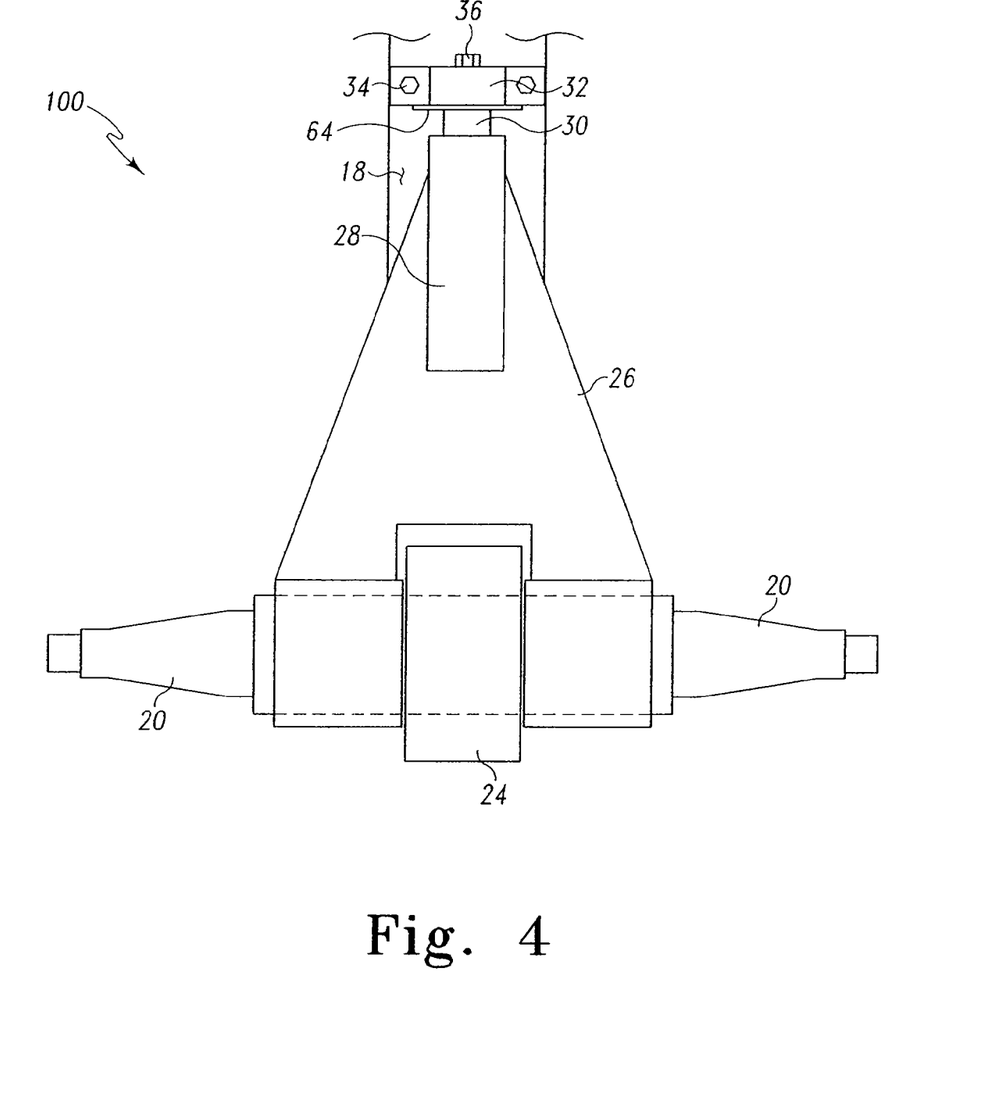
FIG. 4 is a bottom view of the front idler wheel assembly of FIG. 3.

A side view of the front idler wheel assembly 100 is provided in FIG. 3. A bottom plan view of the front idler wheel assembly 100 is provided in FIG. 4. Starting at the right of FIG. 3 (viewed from the opposite side as compared to FIG. 2), the front idler wheel assembly 100 includes an eccentric bushing 32 mounted below the frame 18. A front alignment shaft 30 is provided with a ball (not shown) that engages a ball socket 62 (not shown in FIG. 2 or 3, but see FIG. 6), provided as part of the eccentric bushing 32. A front alignment tube 28 is journalled around the alignment shaft 30. An alignment bracket 26 is fixedly attached, as for example by welding, to the exterior of the front alignment tube. The alignment bracket 26 is fastened to the front spindle 20. In the embodiment of FIG. 2, the alignment bracket is fastened to the front spindle 20 by wrapping around the front spindle 20 on each side of a centrally located housing 24. The housing 24 contains a spherical bushing 76 (not shown in FIG. 2) to which the front spindle 20 is attached. The spherical bushing contained in the housing 24 permits the front spindle 20 to pivot universally. The housing 24 is mounted, for example by a weldment, to an end plate 38 provided at the front end of the frame 18. Braces 40 and 42 may be provided between the frame 18 and the housing 24 to provide additional support. A pair of stops 44 (only one is visible in FIG. 2) are provided on the top of the attachment bracket 26. These stops prevent the spindle 20 from pivoting too far, which can result in the idler wheels 14 rubbing against the frame 18.

Figure 6:
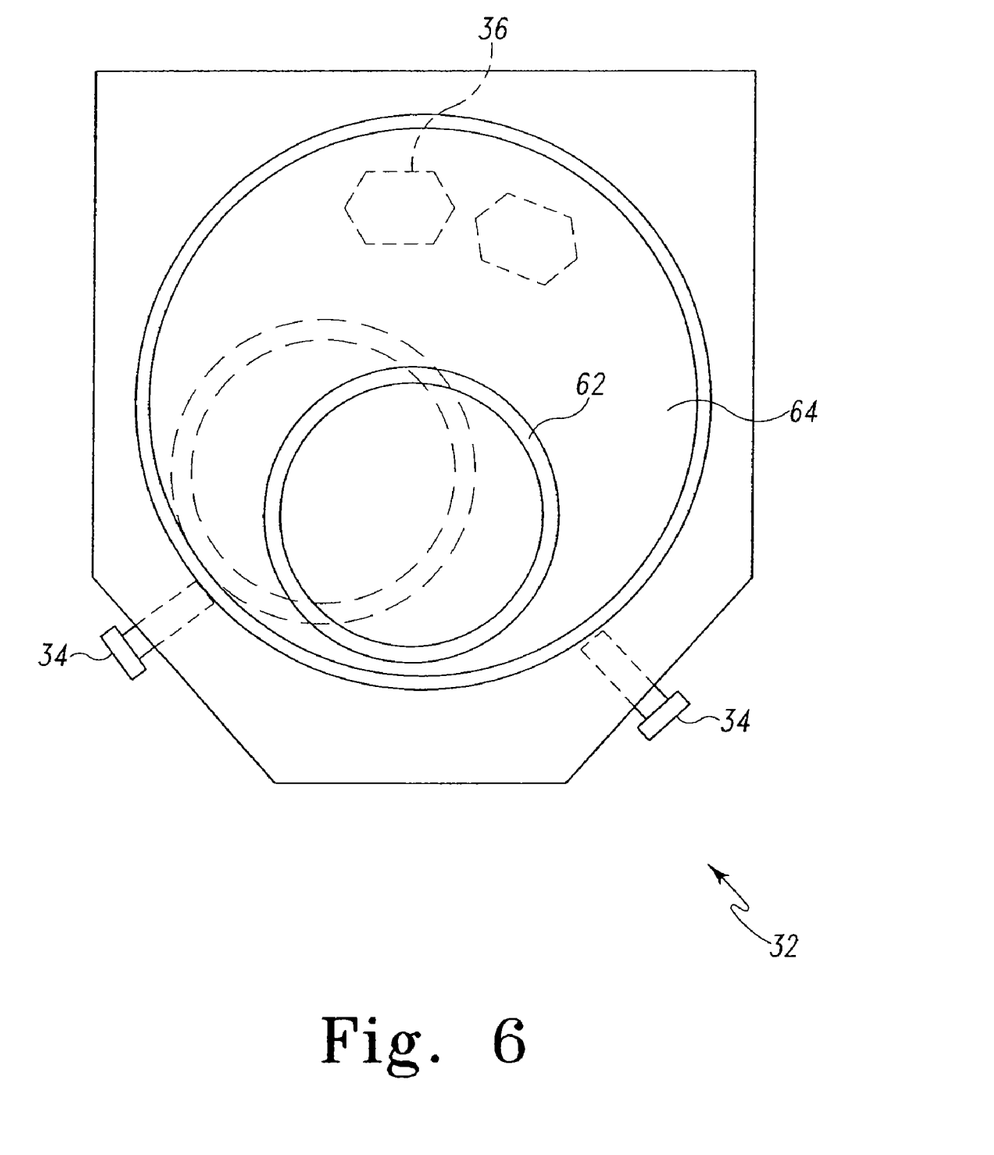
FIG. 6 is a detail front view of an eccentric bushing according to one embodiment of the present invention.

The alignment feature of the front idler wheel assembly 100 is accomplished through the combination of the eccentric bushing 32, the ball socket 62 in the eccentric bushing 32, and the spherical busing in housing 24. A detailed front view of the eccentric bushing 32 is provided in FIG. 6. The alignment of the front idler wheel 14 is accomplished by loosening the set screws 34, and then rotating the rotating member 64 to adjust the position of the ball socket 62. The set screws 34 are then retightened to retain the rotating member 64 in the second position. The knob 36, provided on the back side of the rotating member 64 may be used to help turn the rotating member 64. In the embodiment shown, the knob 36 is formed by a bolt head welded to the rotating member 64 so that a wrench, can be used to grasp the knob and make the adjustment. FIG. 6 shows in broken lines a second position for the rotating member 64, wherein the rotating member 64 has been rotated clockwise to move the ball socket 62, and hence the rear end of alignment shaft 30 to the left. The front idler wheel 14 is thereby toed inward, if the front idler wheel assembly 100 is mounted on a left track assembly 10, or, toed outward if the front idler wheel assembly is mounted to a right track assembly 10. It should be understood that rather than a rotating eccentric bushing, any alternative structure could be used that permits selective sliding of the ball socket 62 from side to side.

Figure 5:
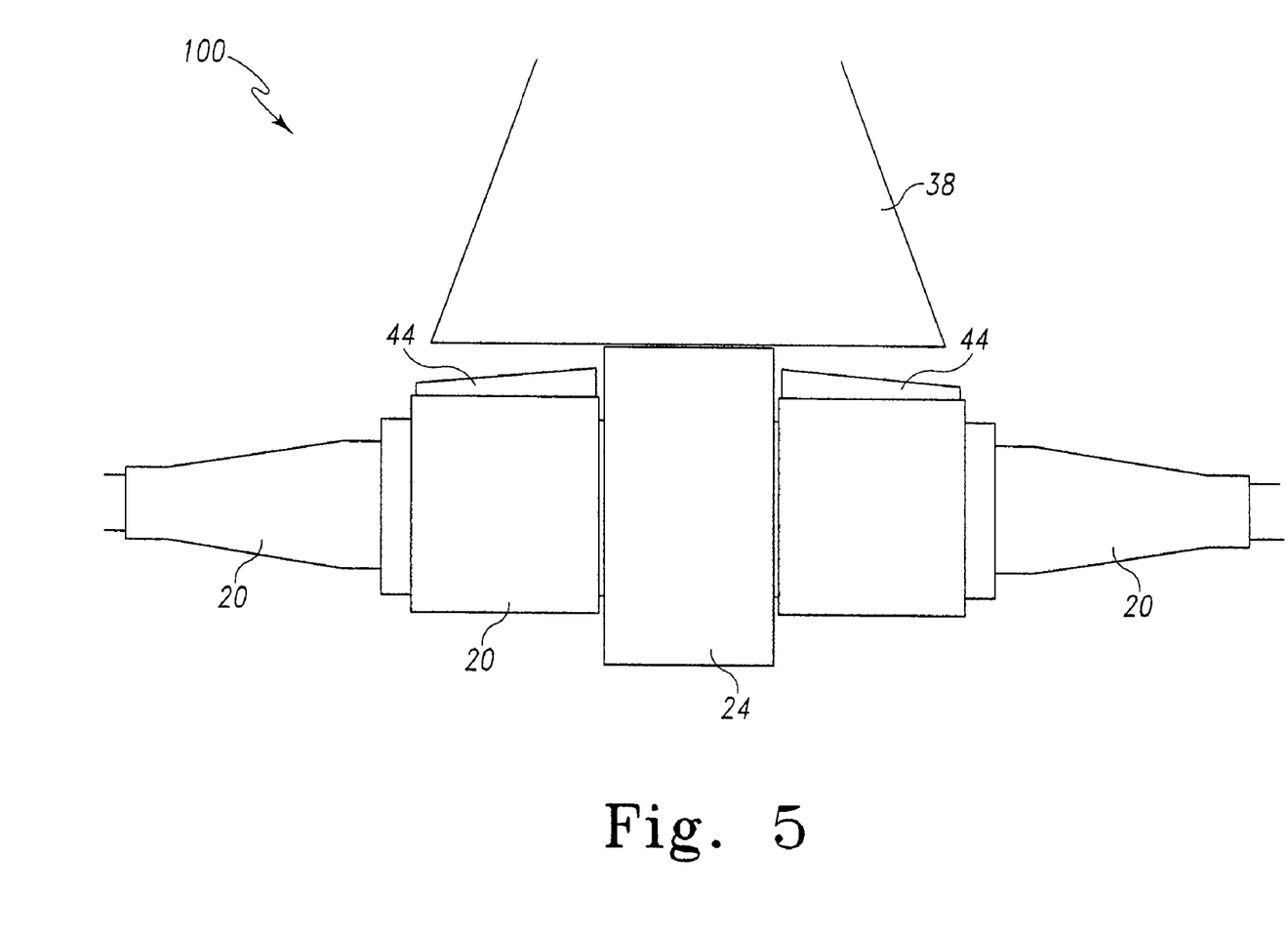
FIG. 5 is a front view of the front idler wheel assembly of FIG. 3.

The side-to-side tilting of the spindle 22 is accomplished through the spherical bushing 66 within the housing 24. This spherical bushing 66 permits the spindle 22 to tilt as the front idler wheels 14 attached to it are subjected to tilting forces through the tread 15 as the tread passes over uneven ground. The tilting of the spindle 22 causes a corresponding rotation of the alignment bracket 26, which rotation is permitted because of the rotatable connection between the alignment tube 28 and the alignment shaft 30. As best seen in FIG. 5, front tilt stops 44 on the top of the alignment bracket 26 bump up against the top plate 38 to prevent the spindle 20 and front idler wheels 14 from tilting too far. Typically these tilt stops 44 are set to limit the tilt to no more than 5 degrees of rotation for a wide track 12, or as little as 1 degree for a narrow track 12.

Therefore, as with the front idler wheel assembly 100 discussed above, the rear idler wheel assembly 200 permits the rear idler wheels 16 to tilt along with the track 12, when the tread 15 passes over uneven ground. As a result the weight of the cart remains evenly distributed across the entire width of the tread 15, rather than being localized. This reduces stress on the tread 12 and spindles 20, 22, and other components, and improves handling.

Figure 7:
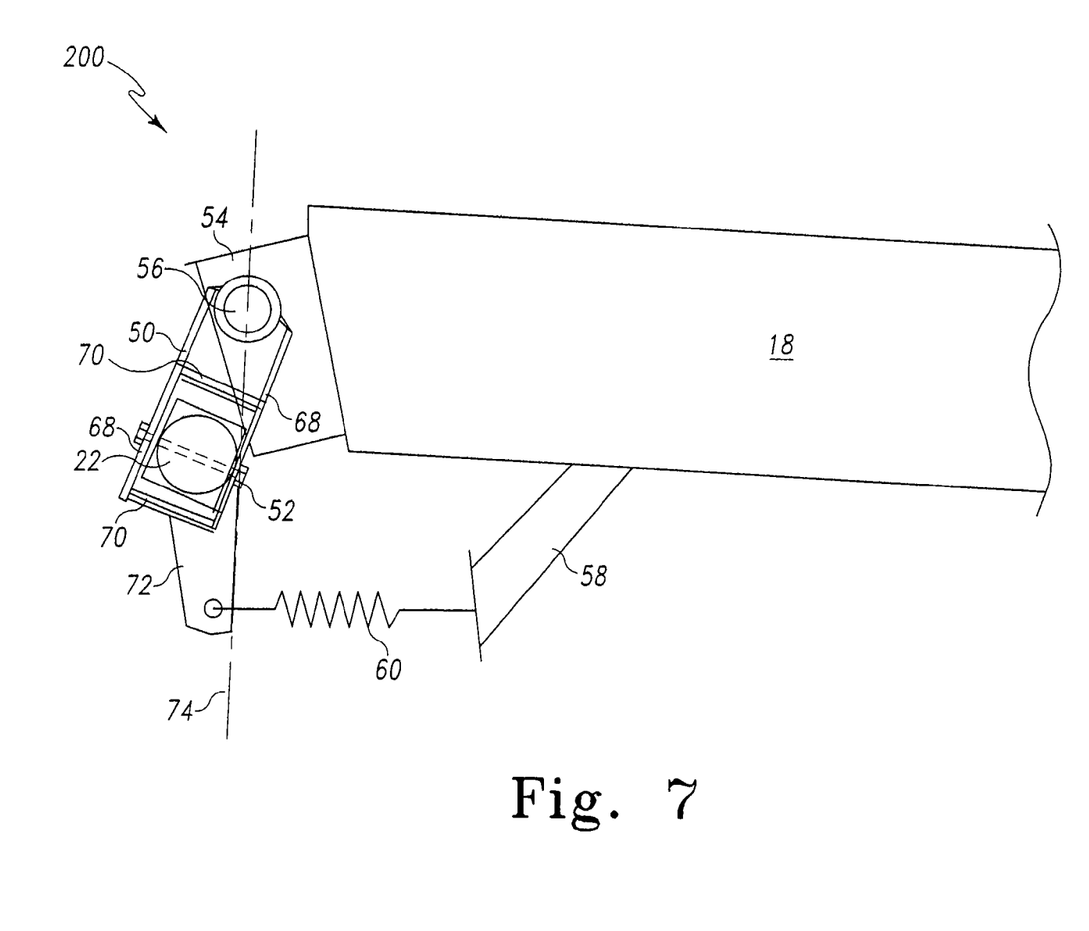
FIG. 7 is a partial side view of a rear idler wheel assembly according to one embodiment of the present invention.
Figure 8:
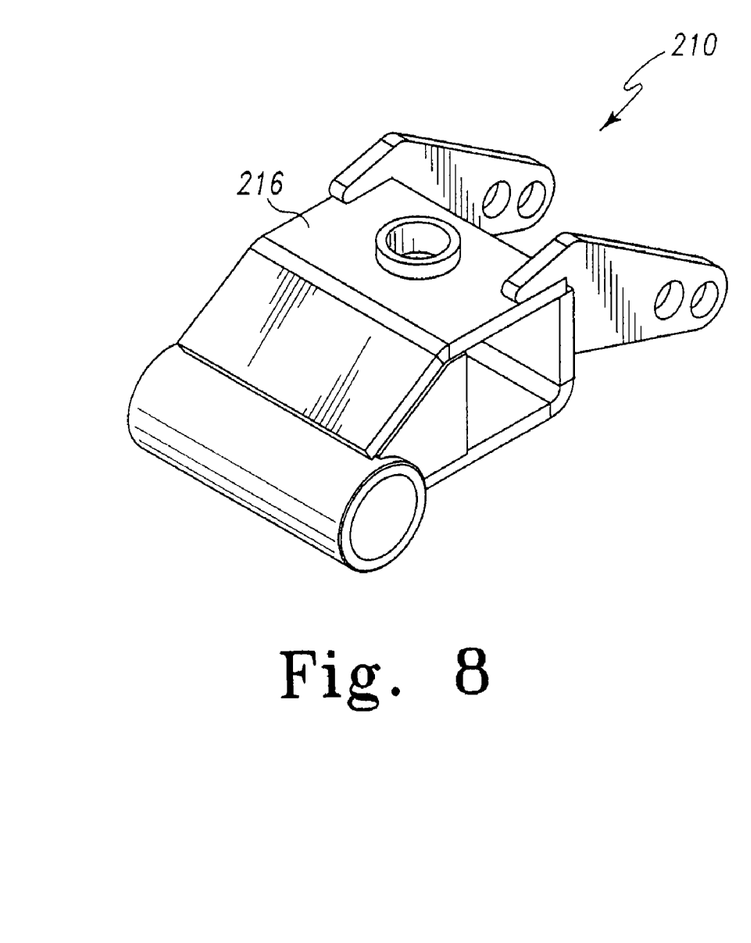
FIG. 8 is a perspective view of the tensioning member of one embodiment for use in an idler wheel assembly.
Figure 9:
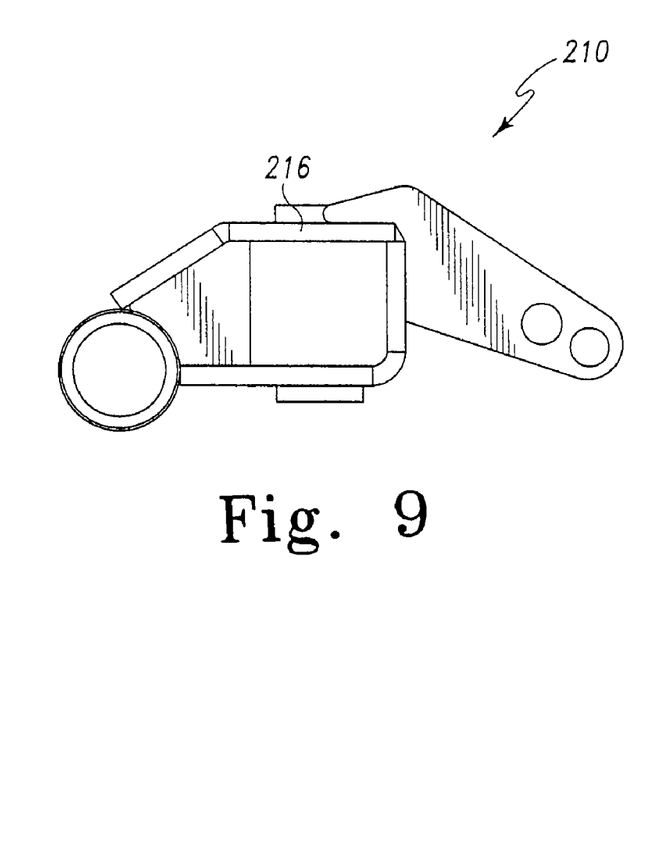
FIG. 9 is a side elevational view of the tensioning member taken along line 9-9 of FIG. 8.

The rear idler wheel assembly 200 is best seen in FIG. 7, which is a detail view of the rear portion of the track assembly 10 of FIG. 2. As seen in FIG. 7, a rear frame bracket 54 is fixedly attached at the rear of frame member 18. A tension bracket 50 is pivotally attached to the frame bracket 54 by a pivot member 56, such that the tension bracket 50 pivots about the pivot member 56 in a generally vertical plane. The tension bracket 50 has a pair of opposing faces 68 that are spaced apart. The rear spindle 22 is provided between the opposing faces, and a pivot bolt 52 is passed though both faces 68 and through a passageway in the rear spindle 22, to pivotally connect the rear spindle to the tension bracket 50. Rear stops 70 are provided to limit the amount of tilt that can be introduced to the rear spindle 22. These rear stops 70 may take the form of plates provided between the opposing faces 68, or any other device that will limit the amount the rear spindle 22 can pivot around the pivot bolt 52.

Figure 10:
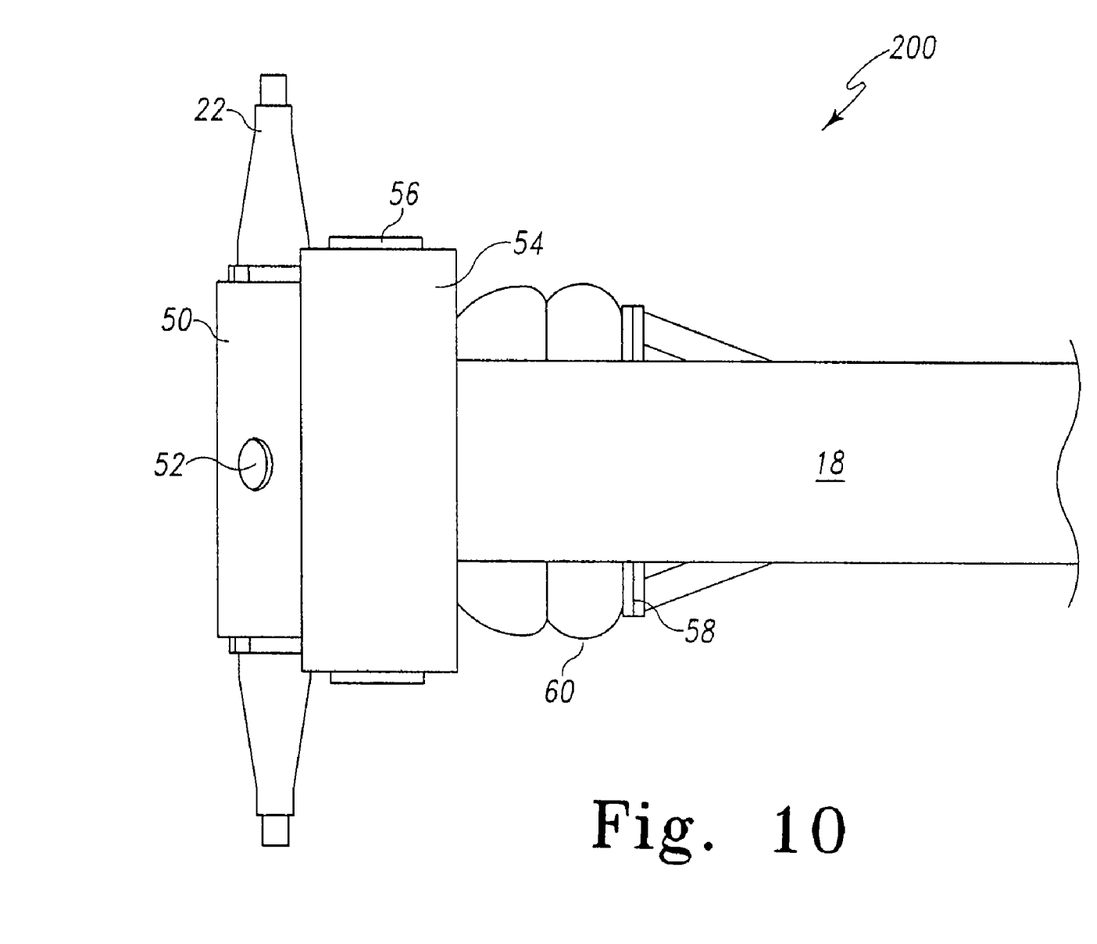
FIG. 10 is a top view of the rear idler wheel assembly of FIG. 7, with the tensioning member removed for illustration purposes.
Figure 11:
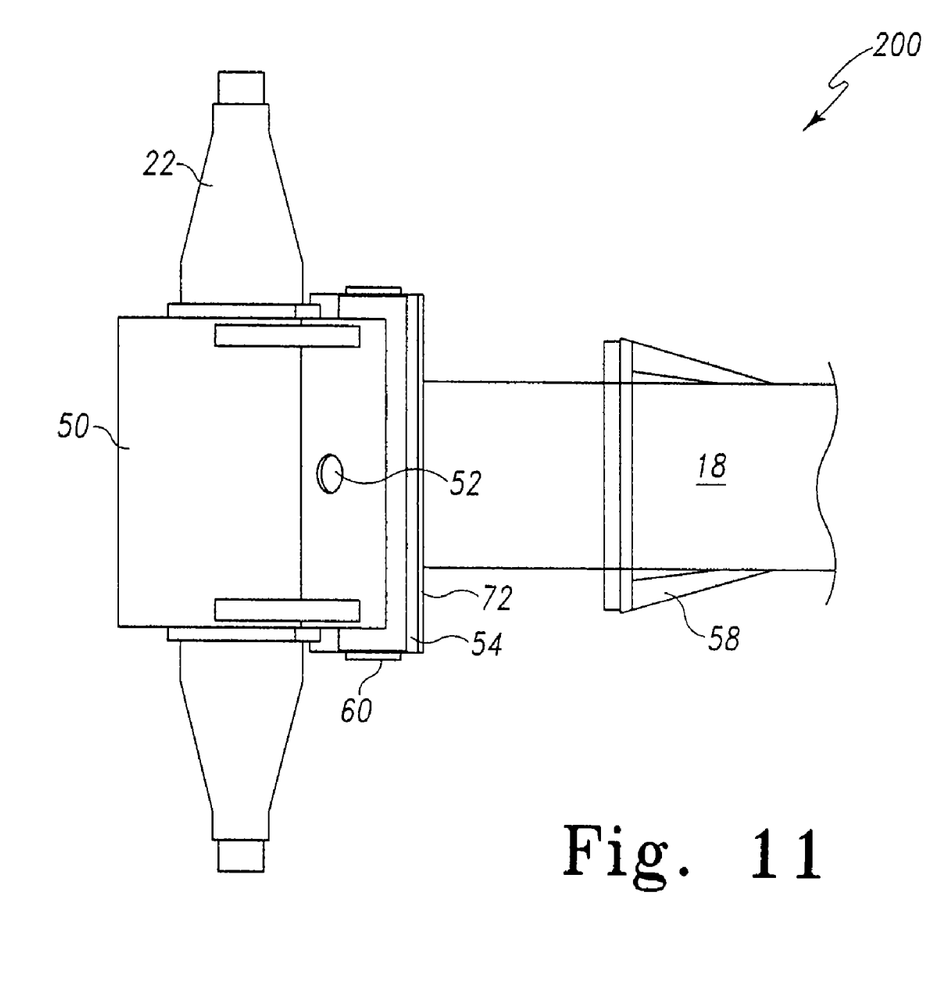
FIG. 11 is a bottom view of the rear idler wheel assembly of FIG. 7 with the tensioning member removed for illustration purposes.
Figure 12:
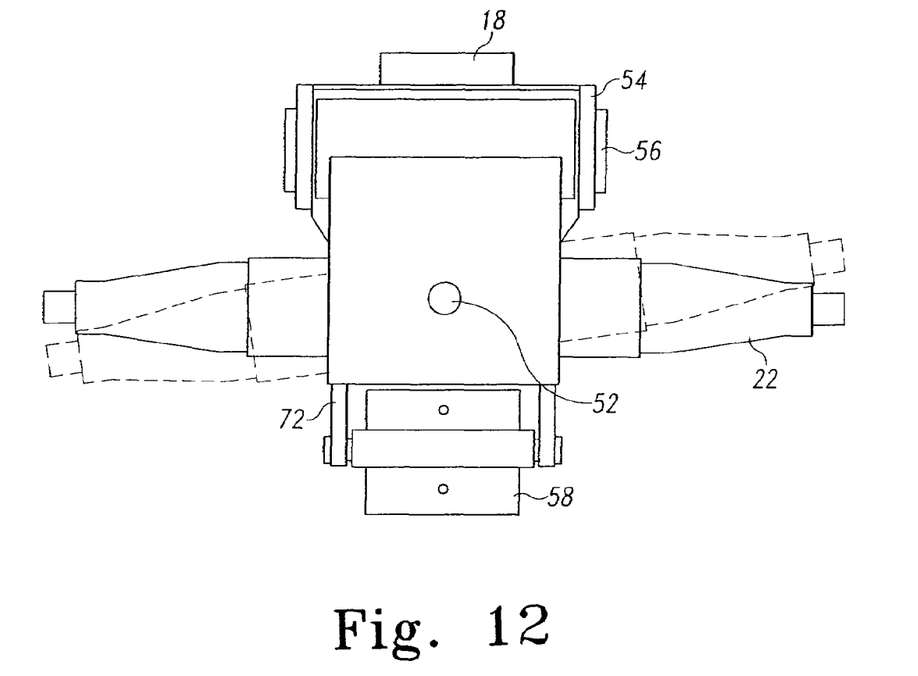
FIG. 12 is a rear view of the rear idler wheel assembly of FIG. 7, with broken lines indicating a tilted position for the spindles.

Additional views of the rear idler wheel assembly are shown in FIGS. 8-12. FIG. 10 is top view of the rear idler wheel assembly, and FIG. 11 is a bottom view with the tensioning device removed. The tensioning device shown in FIGS. 8-10 may be an inflatable air shock. The tension provided can be adjusted by filling the bladder of the air shock to different pressure levels. Alternatively, the tensioning device may be configured to operate in proportion to the load applied. That is, as the load or downward force upon the tensioning device increases, the tension upon the belt increases by resultant change in the position of the tensioning device. FIG. 12 is a rear view of the rear idler wheel assembly. FIG. 12 illustrates the tilting feature of the spindles in broken lines.

Intermediate idler wheels may be provided to provide additional support to the tread 15 portion of the track 12. Preferably these idler wheels are of the form described in co-pending U.S. application Ser. No. 09/847,264, which has been fully incorporated by reference herein. In particular the tandem arm and idler wheels shown in FIGS. 18, 19A, 19B, 22, and 24 and the accompanying discussion are preferred. These intermediate idler wheels also match the tilt of the tread 15 to more evenly distribute the weight of the cart across the entire face of the tread 15 and among the idler wheels.

A tensioning device 60, such as for example an air shock, is provided between the bottom of the frame member 18 and a shock attachment bracket 70. The shock attachment bracket is fixedly attached to the tension bracket 50, and operable forms a part of the tension bracket 50. If an air shock is used, the amount of tension provided to the track 12 can be adjusted by inflating and deflating the air shock. A tensioner base 50 may be provided on the bottom of frame member 18 for mounting one end of the tensioning device. The tensioning device 60 maintains the rear spindle 22 at an appropriate distance behind the frame member 18.

Importantly, the centerline of pivot member 56 is situated above and forwardly from the rear spindle 22. An imaginary dividing plane 74 extending vertically above and below the pivot member can be used to determine whether the centerline of the rear spindle is behind the pivot member. Therefore, as greater load is applied downwardly to the frame 18 (as by a large payload), or upwardly to the spindle 22 (as by a jolt when passing over a bump), it tends to rotate the tension bracket 50 rearward, which adds tension to the track 12 by virtue of pulling the rear idler wheels 16 farther apart from the front idler wheels 14. It should be noted that the tensioning structure described herein could be used on the front end of a track assembly as opposed to the rear end. Because of the tendency of the assembly 200 to automatically increase the tension in the tread 12 as additional load is added, it is not necessary to use as high a capacity tensioning device 60 as would otherwise be required. Therefore smaller hydraulic shocks may be used, or if an air shock is used, it need not be filled to as great a pressure as otherwise would be necessary.

Figure 13:
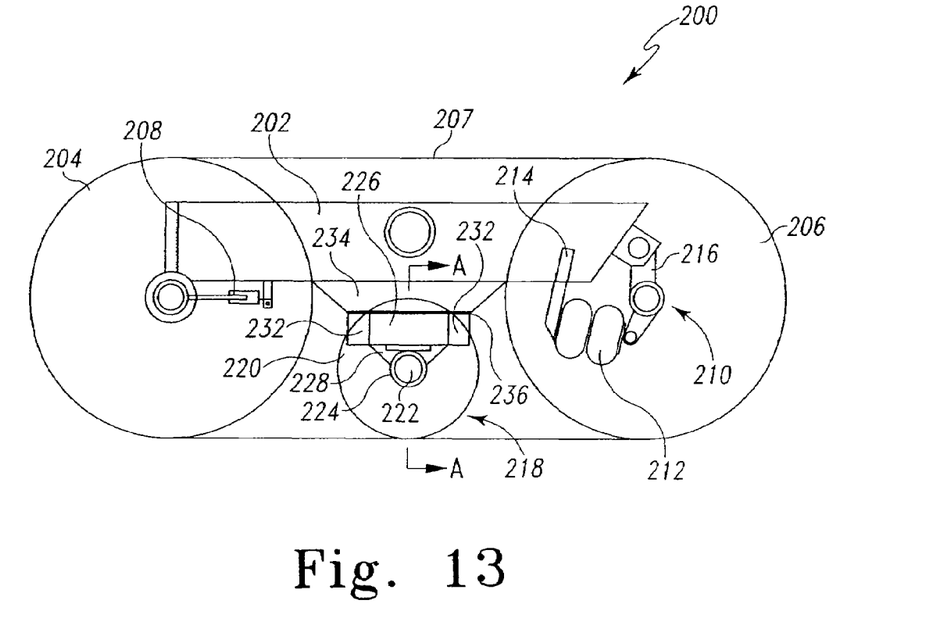
FIG. 13 is a side elevation view of an embodiment of the present invention that includes a single tilting bogie wheel structure.
Figure 14:
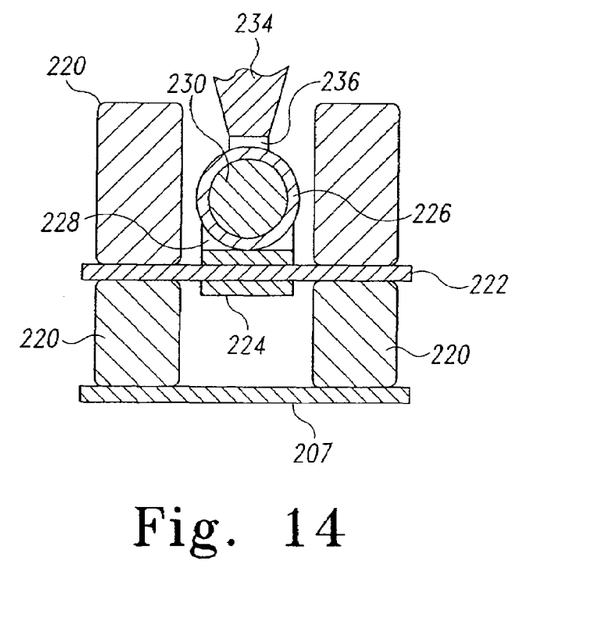
FIG. 14 is a cross-sectional view of the bogie wheel structure of FIG. 13 taken along line A-A of FIG. 13.

FIGS. 13 and 14 show another embodiment of a track cart 200 according to another embodiment of the present invention. FIG. 13 is a side elevation view of track cart 200 generally showing a frame 202 that has a first idler wheel 204 and a second idler wheel 206 mounted generally at opposite ends of the frame 202. A continuous traction belt 207 is provided around the idler wheels 204 and 206. An alignment mechanism 208, similar to that described above, is shown in association with first idler wheel 204 in order to provide proper alignment between the first and second idler wheels 204 and 206. A tensioning structure 210, including an air shock 212 mounted between brace 214 and linkage 216 is shown in association with the second idler wheel 206. The details and advantages of this tensioning structure 210 are described above.

A single bogie wheel structure 218 is mounted to the frame 202 generally intermediately between the first and second idler wheels 204 and 206. The bogie wheel structure 218 utterly distributes the weight of the cart 200 across the bottom run of the continuous belt 207.

The bogie wheel structure 218 is designed to rock or pivot laterally in order to match the contour of ground across which the frame 200 is being transported and to avoid stress points on the bogie wheel structure 218 and the belt 207 by maintaining even weight distribution. The details of the bogie wheel structure 218 are best seen in FIG. 14. Small bogie wheel rollers 220 are mounted on an axle 222. It should be appreciated, that rather than mounting the rollers 220 on a single axle, the rollers 220 may be mounted independently of each other. The axle 222 is mounted within a bushing 224 or other support structure that is fixed to tube 226. A web 228 or other structure may be used to secure the tube 226 to the support structure 224 supporting axle 222. A pin or rod 230 is journaled within tube 226 and rotatably captured at each end by pin caps 232. The pin caps 232 are mounted to frame connector 234 by pin cap supports 236. The frame connector 234 may be a flange or other item attached to the frame 202, or may be formed as an integral part of the frame 202. The pin cap support 236 may be a weldmant, a bolt or other known fastening device.

Therefore, the lower portion of the bogie wheel structure 218, including the rollers 220, the axle 222, the bushing 224, the web 228, and the tube 226 are mounted to pivot relative to the upper portion of the bogie wheel structure 218 including the pin caps 232, pin cap support 236 and frame connector 234. Therefore, as the cart 200 is pulled across uneven ground, or impediments such as rocks or bumps, the intermediate rollers 220 can tilt to permit twisting of the belt 207 in order to maintain even weight distribution among the rollers 204, 206 and 220.

It should be appreciated that rather than utilizing a pin 230 mounted within tube 236, the tube 226 could be formed with a sold interior that includes protections to engage pin caps 232. Similarly, rather than provide a pin 230 within the tube 226, the pin caps 232 could be provided with male projections that extend into the tube 226 to act as the axle upon which the lower portion of the bogie wheel structure pivots.

One of ordinary skill in the art will appreciate further features and advantages of the invention based on the above-described embodiments. Accordingly, the invention is not to be limited by what has been particularly shown and described, except as indicated by the appended claims. All publications and references cited herein, including those in the background, are expressly incorporated herein by reference in their entirety.

I claim:

1. A track assembly comprising:
   a frame;
   a first idler wheel connected to said frame;
   a second idler wheel connected to said frame;
   a bogie wheel structure pivotally connected to said frame to rock laterally about a roll axis and positioned between said first and second idler wheels;
   a continuous track provided around said first idler wheel, said bogie wheel, and said second idler wheel, said continuous track having a tread portion formed by a lower span of said continuous track.

2. A track assembly as recited in claim 1, further comprising an elongated spindle tiltably connected to said frame to tilt from side to side and wherein said first idler wheel is rotably mounted to said elongated spindle.

3. A track assembly as recited in claim 2, wherein said first spindle is provided with an alignment mechanism for selectively varying an alignment of said first idler wheel.

4. A track assembly as recited in claim 1, further comprising a link pivotally connected at one end of said frame at a pivot member to pivot in a generally vertical plane about a pivot axis defined by said pivot member, an imaginary dividing plane being defined by a vertical extension of said pivot axis and wherein said second idler wheel is rotably connected to said link; a tensioning device between said frame and said link to maintain an axis of said second idler wheel below said pivot member and on a side of said imaginary dividing plane opposite from said first idler wheel.

5. A track assembly as recited in claim 4, further comprising an elongated spindle tiltably connected to said frame to tilt from side to side, wherein said first idler wheel is rotably mounted to said elongated spindle; and wherein said elongated spindle is provided with an alignment mechanism for selectively varying an alignment of said first idler wheel.

* * * * *